(12) United States Patent
Eberhardt et al.

(10) Patent No.: US 6,236,316 B1
(45) Date of Patent: *May 22, 2001

(54) TRANSPORT DEVICE WITH OPENINGS FOR CAPACITIVE COUPLED READERS

(75) Inventors: Noel H. Eberhardt, Cupertino; Victor Allen Vega, Hercules; James Gerard Quaderer, Sunnyvale, all of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/477,877

(22) Filed: Jan. 5, 2000

Related U.S. Application Data (63) Continuation of application No. 09/225,760, filed on Jan. 5, 1999, now Pat. No. 6,107,921.

(51) Int. Cl.[7] .................................................. G08B 13/14
(52) U.S. Cl. ................................ 340/572.7; 340/572.8; 343/866; 343/764; 343/765; 343/766
(58) Field of Search .......................... 340/752.1, 572.7, 340/572.8, 825.54, 10.2; 235/440, 492; 343/866, 764, 720, 765, 766

(56) References Cited

U.S. PATENT DOCUMENTS

| | | | |
|---|---|---|---|
| 3,713,102 | 1/1973 | Martin | 340/572.1 |
| 3,832,530 | 8/1974 | Reitboeck et al. | 340/572.1 |
| 3,843,036 | 10/1974 | Monahan et al. | 228/6.2 |
| 4,578,626 | 3/1986 | Richeter | 388/806 |
| 4,783,646 | 11/1988 | Matsuzaki | 340/572.5 |
| 4,818,855 | 4/1989 | Mongeon et al. | 235/440 |
| 4,900,386 | 2/1990 | Richter-Jorgensen | 514/419 |
| 4,970,495 | 11/1990 | Matsumoto et al. | 340/572.1 |
| 5,081,445 | 1/1992 | Gill et al. | 340/572.1 |
| 5,175,418 | 12/1992 | Tanaka | 235/439 |
| 5,221,831 | 6/1993 | Geiszler | 235/440 |
| 5,274,392 | * 12/1993 | D'Hont et al. | 343/866 |
| 5,288,235 | 2/1994 | Sobhani | 439/67 |
| 5,300,875 | 4/1994 | Tuttle | 320/138 |
| 5,305,002 | * 4/1994 | Holodak et al. | 343/788 |
| 5,376,923 | 12/1994 | Kindschy | 340/572.3 |
| 5,410,296 | 4/1995 | Montbriand et al. | 340/551 |
| 5,430,441 | 7/1995 | Bickley et al. | 340/10.2 |
| 5,523,749 | 6/1996 | Cole et al. | 340/825.54 |

(List continued on next page.)

FOREIGN PATENT DOCUMENTS

| | | |
|---|---|---|
| 40 17 934 C2 | 1/1992 | (DE) . |
| 0 245 196 A2 | 11/1987 | (EP) . |
| 0 260 221 A2 | 3/1988 | (EP) . |
| 0 260 221 A3 | 3/1988 | (EP) . |

*Primary Examiner*—Benjamin C. Lee
(74) *Attorney, Agent, or Firm*—Terri S. Hughes

(57) ABSTRACT

Identification tags (22) are secured to objects (20) moving upon a transport band (16). The identification tags (22) each contain a transponder circuit (32) in electrical communication with transponder antennae (30, 31). The transponder circuit (32) contains a unique digital code containing data relating to the object (20). When the identification tag (22) is located beneath the object (20), at least one reader antenna (25) is positioned beneath the transport band (16) and in alignment with a selected aperture (34) extending through a support plate (12). One or more apertures (34) in alignment with the reader antenna (25) provide capacitive coupling between the transponder antennae (30, 31) and the reader antenna (25). The reader circuit (28) generates a signal in the presence of an identification tag (22), which is transmitted to the transponder antenna (30) located on the identification tag (22). The signal energizes the transponder circuit (32), which sends a transponder signal via the transponder antenna (30) back to the reader antenna (25). The reader circuit (28) demodulates the transponder signal to identify the data.

18 Claims, 5 Drawing Sheets

U.S. PATENT DOCUMENTS

| | | |
|---|---|---|
| 5,528,222 | 6/1996 | Moskowitz et al. .............. 340/572.7 |
| 5,557,096 * | 9/1996 | Watanabe et al. .................... 235/492 |
| 5,566,441 | 10/1996 | Marsh et al. ........................... 29/600 |
| 5,682,143 | 10/1997 | Brady et al. ...................... 340/572.7 |
| 5,689,239 | 11/1997 | Turner et al. ..................... 340/572.1 |
| 5,710,458 | 1/1998 | Iwaski ................................. 257/679 |
| 5,786,626 | 7/1998 | Brady et al. ......................... 257/673 |
| 5,793,305 | 8/1998 | Turner et al. ................... 340/825.54 |
| 5,847,447 | 12/1998 | Rozin et al. .......................... 257/678 |
| 5,850,187 | 12/1998 | Carrender et al. .................. 340/10.6 |
| 5,854,480 | 12/1998 | Noto ..................................... 235/492 |
| 5,929,760 | 7/1999 | Monahan .......................... 340/572.7 |
| 6,001,211 | 12/1999 | Hiroyuki .............................. 156/277 |
| 6,107,921 * | 8/2000 | Eberhardt et al. ................ 340/572.7 |

* cited by examiner

TRANSPORT DEVICE WITH OPENINGS FOR CAPACITIVE COUPLED READERS

CROSS-REFERENCE TO RELATED APPLICATIONS

This is a continuation-in-part of a pending commonly-assigned prior application by Noel H. Eberhardt et al. titled "Conveyor Bed with Openings for Capacitive Coupled Readers," application Ser. No. 09/225,760, filed Jan. 5, 1999, now U.S. Pat No. 6,107,921, the disclosure of which prior application is hereby incorporated by reference, verbatim and with the same effect as though it were fully and completely set forth herein.

TECHNICAL FIELD

This invention relates to the identification of objects placed upon a transport device, wherein the objects have identification tags. The transport device has openings which enable scanning of identification tags by capacitive coupled readers located beneath the object on the transport device.

BACKGROUND OF THE INVENTION

Automatic transport devices often transport a plurality of goods in objects which must be individually identified to be properly sorted. Parcels, such as airline baggage, shipping containers, production inventory, machine parts, and component parts, are often identified with flexible tags or labels. Electromagnetic sensing is sometimes used to identify the flexible tags or labels on individual objects placed upon a conveyor. When the objects are oriented so that the identification tags are located beneath the object on a conveyor, they cannot be read by conventional line of sight reading equipment located above the conveyor.

U.S. Pat. No. 5,450,492 issuing to Hook et al. on Sep. 12, 1995 is representative of an electronic identification system having a transmitter for generating an electromagnetic excitation signal, and one or more transponder s with variable time and frequency.

U.S. Pat. No. 4,724,953 issuing to Winchester on Feb. 16, 1988 discloses a food conveyor apparatus having a plurality of rows of oblong holes positioned along the length of the conveyor, with each row offset from adjacent rows of holes. The platform supports an endless mesh conveyor band. The plurality of holes and the endless mesh conveyor band allow food debris to fall through the conveyor band and platform to simplify cleaning in a food processing environment.

U.S. Pat. No. 5,040,549 issuing to Ray on Aug. 20, 1991 discloses a band conveyor for feeding tobacco into a cutting machine. A plate supporting the conveyor band has a plurality of apertures through which debris may fall or be swept, and a means below the plate to collect the particulate material.

To be effective, the identification tags on individual objects must be oriented to position the identification tags in relation to the reader antenna positioned in proximity to the conveyor band. Manual orientation of the objects to orient the identification tags in relation to reader antenna is labor intensive and time consuming. Where the identification tag is positioned beneath the object, it cannot easily be read by reader antenna positioned above the conveyor. Thus, what is needed is a way to position the reader antenna beneath the conveyor band to read identification tags located beneath the object.

BRIEF DESCRIPTION OF THE DRAWINGS

A preferred embodiment of the present invention will now be described with reference to the accompanying drawings, in which.

DETAILED DESCRIPTION OF THE PREFERRED EMBODIMENT

Figure 1:
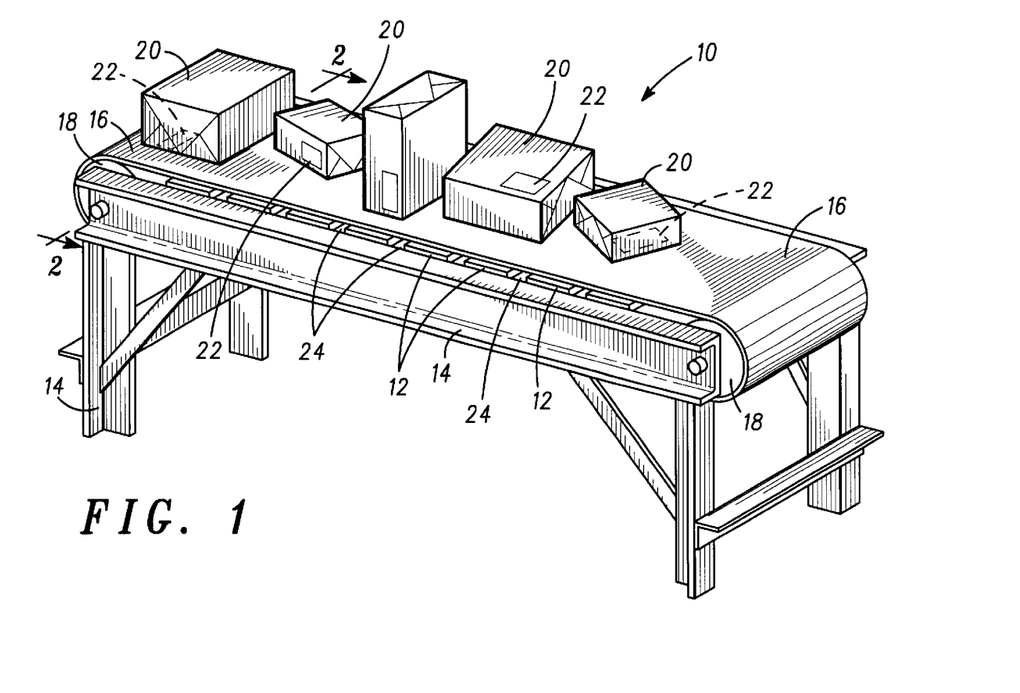
FIG. 1 is a perspective view of a plurality of objects located upon a transport device, with some identification tags located beneath the object.
Figure 2:
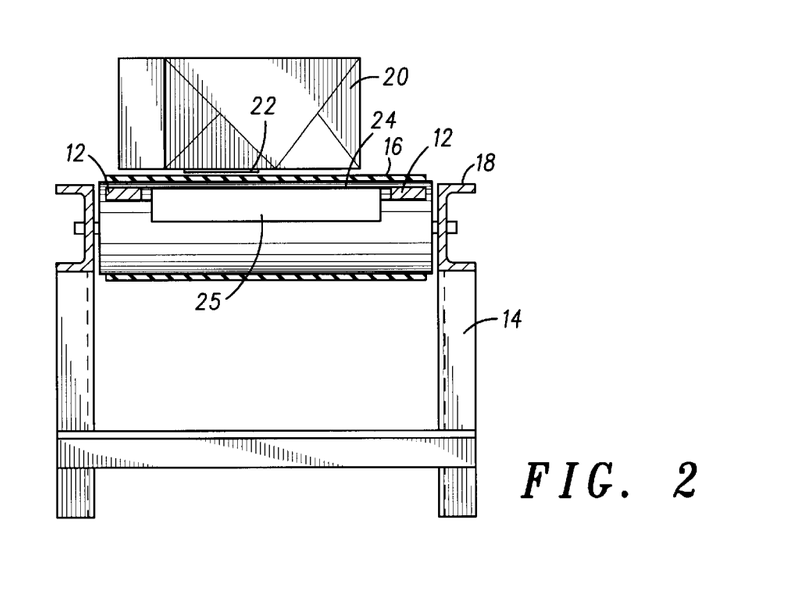
FIG. 2 is a cross sectional view of the transport device taken along lines 2—2 in FIG. 1, showing reader antenna positioned lower than a support plate and in alignment with suitable apertures located in the support plate.

As shown in FIGS. 1 and 2, an object 20 (e.g., a parcel) having an identification tag 22 (e.g., a transponder, RFID label, etc.) secured thereon, is moved along a transport device 10 (e.g., a conveyor). The identification tag 22 contains a transponder circuit comprising at least one transponder antenna 30. In the preferred embodiment, the transponder circuit 32 comprises a first and a second transponder antennae 30, 31. The transponder circuit 32 is in electrical communication with the first and second transponder antennae 30, 31. The transponder circuit 32 contains a unique digital code which contains information/data relating to a specific object, such as the identification, contents, destination, disposition, ownership, history and/or inventory data of the specific object.

Figure 3:
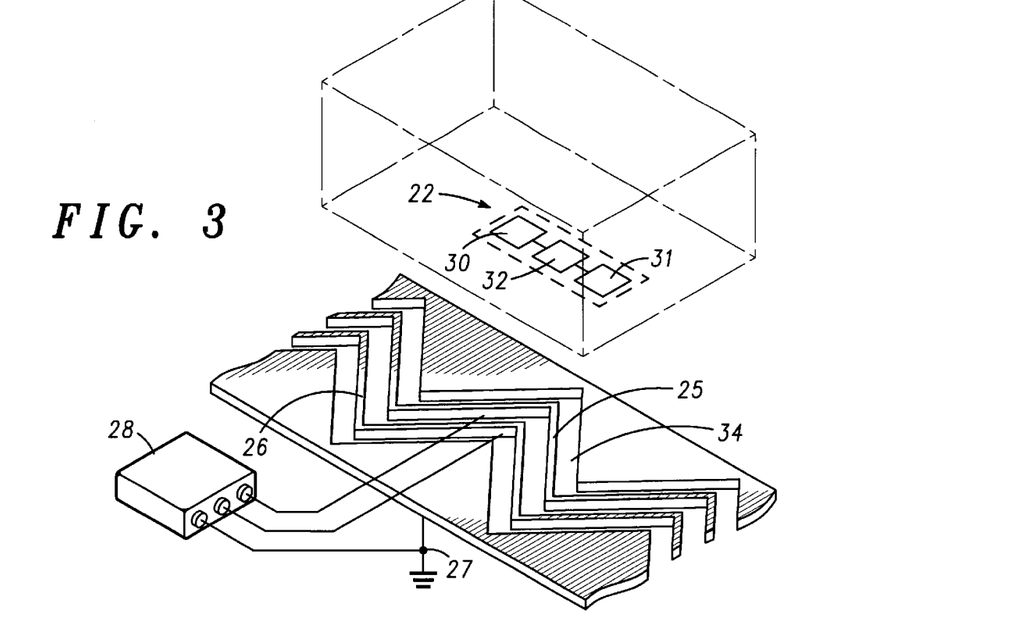
FIG. 3 is a partial top view of the support plate having a zigzag aperture positioned to isolate first and second support plate sides, with an object positioned above the support plate.

The transport device 10 comprises a support plate 12 secured to a frame 14, the support plate 12 having an aperture and/or a separation 34 therein. As shown in FIG. 3, the support plate 12 is made of a first support plate side 42 and a second support plate side 44. The first support plate side 42 is positioned in spaced relation to the second support plate side 44. The first and second support plate sides 42, 44 may each be made of a conductive material, such as steel. Preferably, a pattern of conductive material, however, is secured to a non-conductive support plate, and the pattern of conductive material is connected to respective polarity generated by a reader circuit 28.

Figure 4A:
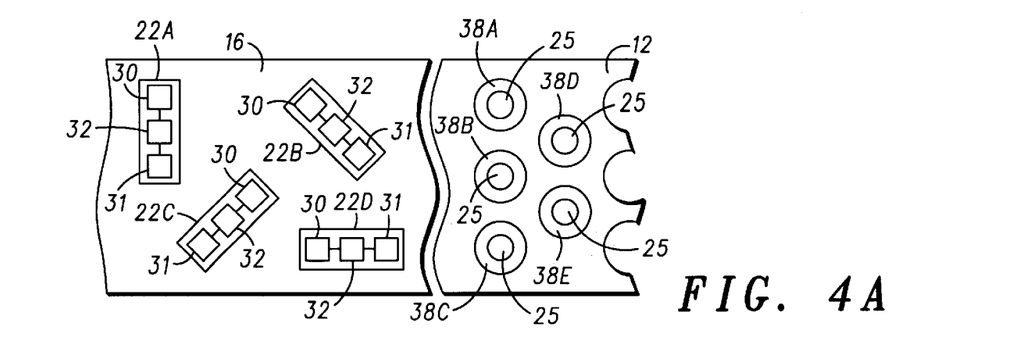
FIG. 4A is a partial top view of the support plate having a plurality of apertures extending through the support plate with a plurality of reader antennae positioned in the apertures, and several transponder circuits shown in various orientations upon a transport band.
Figure 4B:
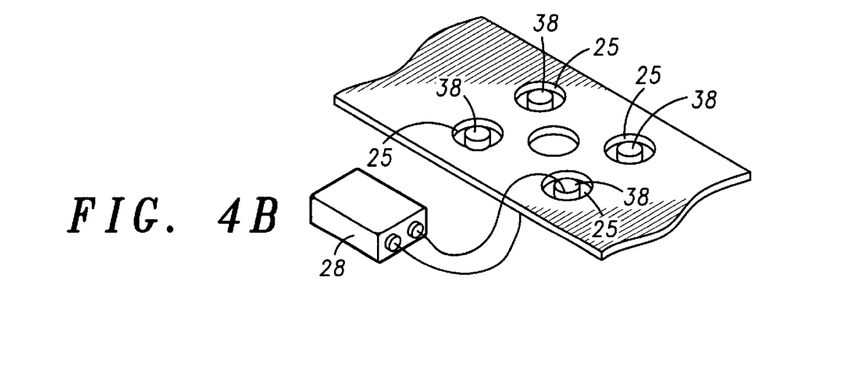
FIG. 4B is a schematic view of the support plate and reader circuit shown in FIG. 4A.

A support plate aperture and/or separation 34 extend in a continuous path between first and second support plate sides 42, 44, electrically isolating first support plate side 42 from second support plate side 44. Preferably, the support plate aperture/separation 34 extends in a zigzag or semi-zigzag path substantially across the width of the support plate 12, isolating the first support plate side 42 from the second support plate side 44. Alternately, a plurality of offset apertures/separation 34 may be provided, as shown in FIGS. 4A and 4B, and first and second support plate sides 42, 44 may be of opposing polarity.

Referring back to FIGS. 1 and 2, a transport band 16 advances along the support plate 12 to move randomly oriented objects 20. The transport band 16 is powered by a suitable drive means 18, such as a motor, band or shaft, to advance the transport band 16 over the conductive support plate 12 and along the frame 14. The transport band 16 is preferably made of a non-conductive material, such as plastic, fiberglass, rubber, to enable a signal to pass through the transport band 16.

Figure 5:
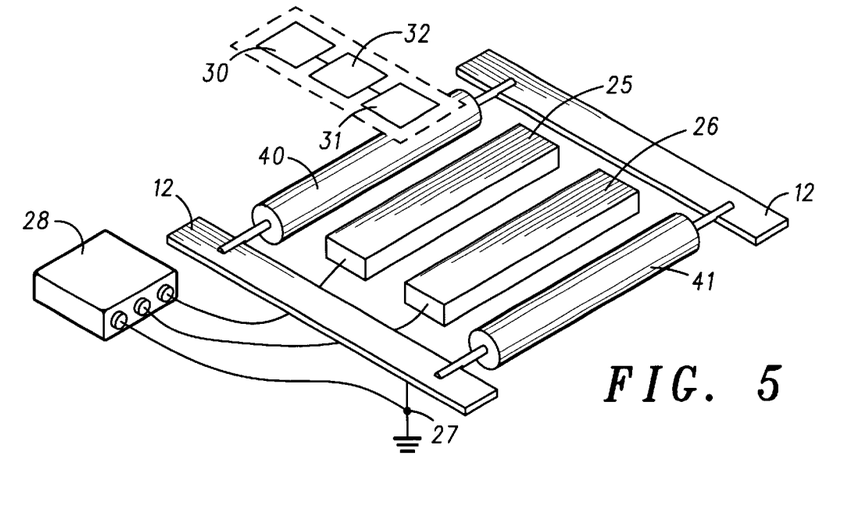
FIG. 5 is a partial view of a plurality of conductive rollers positioned in spaced relation between opposing sides of a frame, and wherein reader antenna are positioned in the space provided between adjacent rollers.

Alternatively, as shown in FIG. 5, a plurality of conductive rollers 40, 41 may extend in spaced relation between opposing sides of the support plate 12. At least one reader antenna 25 is positioned in the space between the rollers 40, 41. The reader circuit 28 may provide one polarity to the conductive rollers 40, 41 and an opposite polarity to at least one reader antenna 25. The rollers 40, 41 may be driven by a chain, band, motor or other suitable drive means 18 to move the objects 20 along the transport band 16 in a manner well known in the art. Alternatively, one or more rollers 40, 41 may be inclined to rotate in the presence of the object 20 by the force of gravity as the object 20 moves along the transport band 16 in a manner well known in the art.

Figure 6A:
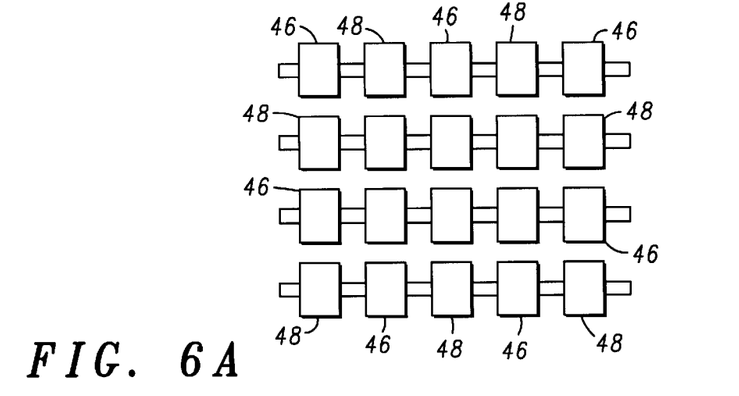
FIG. 6A is a partial view of a plurality of conductive rollers positioned in side by side relation, wherein adjacent rollers are of opposite polarity.
Figure 6B:
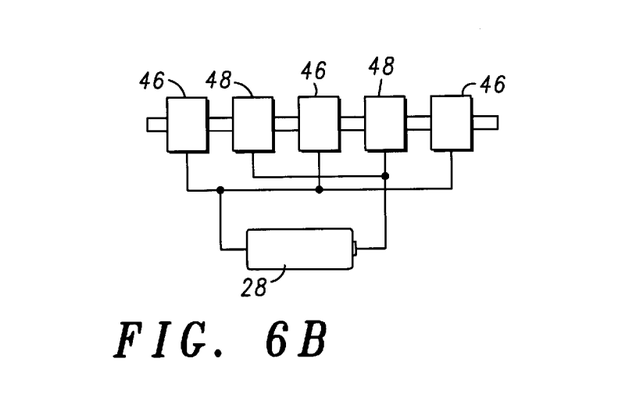
FIG. 6B is a schematic view of the conductive rollers shown in FIG. 6A.

As shown in FIGS. 6A and 6B, the plurality of rollers 46, 48 may be placed in a row in a side-by-side relation between opposing sides of the frame 14. The plurality of rollers 46, 48 in each row may be placed in alternating polarity alignment, with rollers 46 of opposite polarity to rollers 48. Adjacent rows of rollers 46, 48 are positioned in staggered alignment, so that rollers 46 of a given polarity in one row are aligned with rollers 48 of an opposite polarity in an adjacent row. Transponder antennae 30, 31 located in identification tag 22 on the object 20 will cross over rollers 46, 48 of opposing polarity, regardless of the orientation of the object 20 on the transport band 16.

Figure 7A:
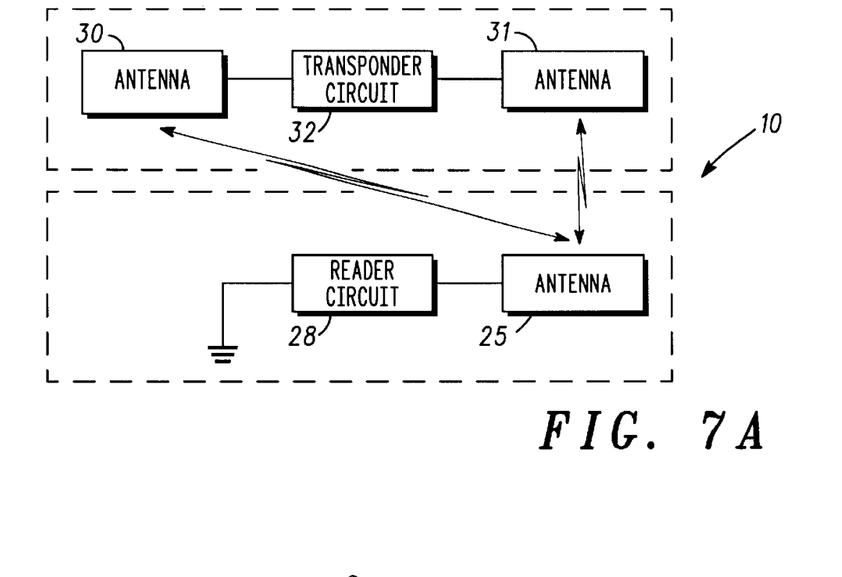
FIG. 7A is a schematic view of the reader circuit and transponder circuit, wherein the reader circuit and first transponder antenna are each coupled to ground.
Figure 7B:
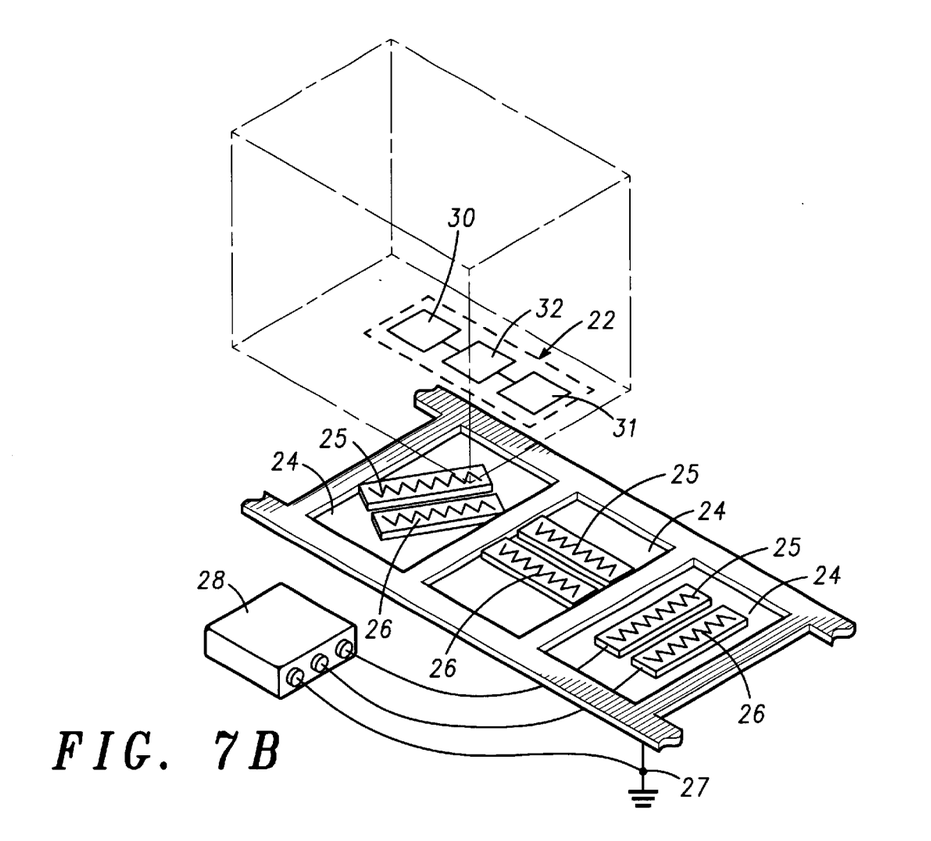
FIG. 7B is a partial view of the support plate with an object positioned above the support plate.

A reader circuit 28 (which may comprise an encoder or programmer) located in proximity to the transport device 10 is in electrical communication with at least one reader antenna 25. For example, if one reader antenna 25 is in electrical communication with the reader circuit 28, common ground coupling is used between the first transponder antenna 30 and the support plate 12 and the reader circuit 28 is coupled to ground as illustrated in FIGS. 7A and 7B, eliminating the need for the first reader antenna 25. As a result, the reader antenna 25 capacitively (electrostatically) couples to at least one transponder antenna 30 to transmit and receive signals.

Figure 7C:
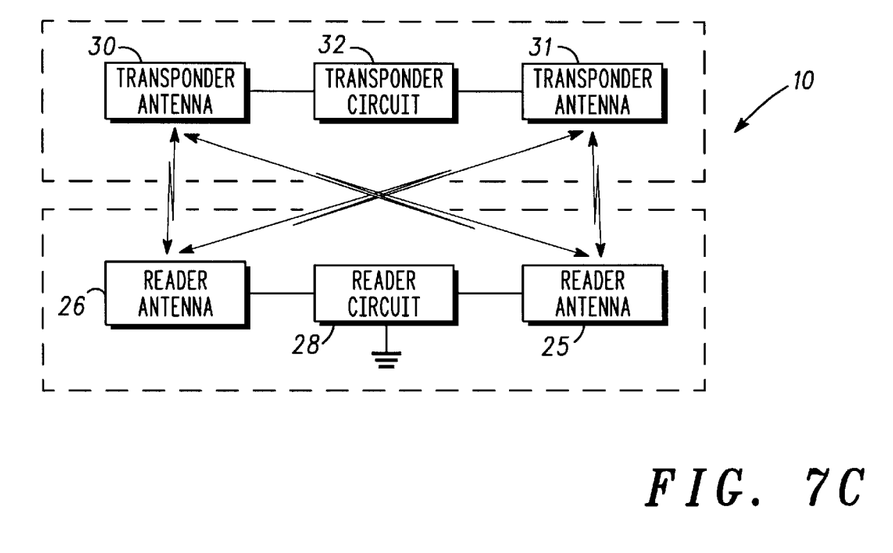
FIG. 7C is a schematic view of the reader circuit with first and second reader antenna and the transponder circuit with first and second transponder antenna.

A further alternative example is when the reader circuit 28 is electrically coupled to two reader antennae 25, 26 as illustrated in FIG. 7C, wherein a first reader antenna 25 could be coupled to ground (e.g., via the support plate 12 or the frame 14) and a second reader antenna 26 is capacitively coupled to at least one transponder antenna 30 and/or 31 to transmit and receive signals. Alternatively, the first and second reader antennae 25, 26 could both be capacitively coupled to at least one transponder antenna 30 and/or 31.

Yet a further example is when the reader circuit 28 is electrically coupled to three reader antennae 25, 26, 27, wherein a first reader antenna 25 is capacitively coupled to at least one transponder antenna 30 and/or 31 to transmit signals, a second reader antenna 26 is capacitively coupled to at least one transponder antenna 30 and/or 31 to receive signals and a third reader antenna 27 is coupled to ground (e.g., via the support plate 12 or the frame 14).

In the preferred embodiment, the reader circuit 28 is electrically coupled to two reader antennae 25, 26 wherein the reader circuit 28 is coupled to ground, a first reader antenna 25 is capacitively coupled to at least one transponder antenna 30 and/or 31 to transmit signals and a second reader antenna 26 is capacitively coupled to at least one transponder antenna 30 and/or 31 to receive signals. For ease of understanding and explanation, the following description adopts the reader configuration of the preferred embodiment.

Preferably, the identification tags 22 are placed upon a side of each object 20 prior to placing the object 20 upon the transport band 16. The objects 20 may be of random size and shape. As the objects 20 are randomly positioned upon the transport band 16, the identification tags 22 may be located anywhere on the object 20. When the identification tag 22 is disposed on a side of the object 20 that is in contact with the transport band 16, line of sight reading equipment usually located above the transport band 16 cannot read the identification tag 22. In order to ensure that each object 20 is properly identified as it passes along the transport band 16, in addition to line of sight reading equipment positioned above the transport band 16, at least the first and second reader antennae 25, 26 are positioned below the support plate 12 and in proximity or alignment with apertures or separations 34 located in the support plate 12. The apertures 34 in the support plate 12 provide for passage of a signal between the first and second reader antennae 25, 26 and the transponder antennae 30, 31 located in the identification tag 22. Thus, if the identification tag 22 is located on the bottom of the object 20, it is read by a reader antenna 25 positioned lower than the support plate 12.

Figure 8:
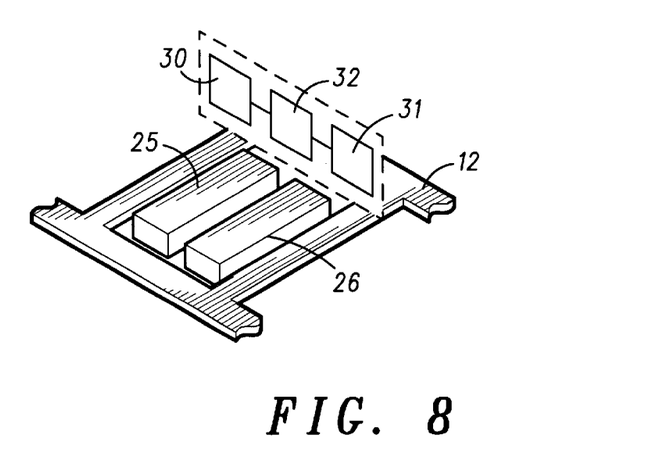
FIG. 8 is a partial view of the support plate, wherein the transponder antenna is positioned in non-parallel alignment with the reader antenna.

FIG. 8 illustrates the first and second transponder antennae 30, 31 located in the identification tag 22 positioned in a non-parallel alignment to the aperture/separation 34. The transponder antennae 30, 31 may be either horizontally or vertically oriented, or a variation of both, with respect to the support plate 12. Referring back to FIG. 4A, several identification tags 22 are positioned in random orientation upon the transport band 16. A plurality of side by side apertures 38A through 38E each have a respective pair of reader antennae 25A through 25E positioned therein. Identification tag 22A couples to reader antennae 25A and 25B. Identification tag 22B couples to reader antennae 25A and 25D. Identification tag 22C couples to reader antennae 25B and 25C. Identification tag 22D couples to reader antennae 25C and 25E. Thus, as the object moves along the transport band, at least one reader antenna 25 couples to one of the transponder antennae 30, 31.

In operation, a reader circuit 28 is in electrical communication with the first reader antenna 25 and second reader antenna 26, both of which are positioned lower than the support plate 12 and in proximity to an aperture/separation 34. The reader circuit 28 generates an excitation signal which is electrically coupled to the first reader antenna 25. Preferably, as the object 20 passes over the aperture 34, the first transponder antenna 30 couples to ground (e.g., via the support plate 12) and the second transponder antenna 31 couples to the first reader antenna 25. The first reader antenna 25 capacitively couples the excitation signal, which may include commands from the reader circuit 28, to the identification tag 22, thereby activating the transponder circuit 32. The excitation signal serves as a power source and a clock source for the transponder circuit 32. The identification tag 22 generates and capacitively couples a transponder signal to the reader circuit 28 via the transponder antennae 30, 31 and the second reader antenna 26. The transponder signal is received by the second reader antenna 26 as the object 20 traverses across the support plate aperture 34 located between the first support plate side 42 and the second support plate side 44. The second reader antenna 26 electrically couples the transponder signal to the reader circuit 28 where the transponder signal is demodulated to identify the data in the transponder signal, such as the ownership, contents, history, destination, and/or disposition of the object.

While the invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A reader apparatus for use with a transport device having a support plate with a separation therein, the reader apparatus, when operating with the transport device, is used for identifying an object having an identification tag attached thereto, wherein the identification tag comprises at least one transponder antenna, the reader apparatus comprising:
    a first reader antenna and a second reader antenna designed to be positioned lower than the support plate and in proximity with the separation located in the support plate; and
    a reader circuit in electrical communication with the first and second reader antennae such that when the object moves across the separation located in the support plate, the first reader antenna couples with the at least one transponder antenna to power the identification tag, the second reader antenna couples with the at least one transponder antenna to read the identification tag at the reader circuit and the reader circuit couples to ground.

2. The reader apparatus in accordance with claim 1 wherein the separation is an aperture.

3. The reader apparatus in accordance with claim 1 wherein the reader circuit generates an excitation signal, the first reader antenna transmits the excitation signal to the at least one transponder antenna, and the second reader antenna receives a transponder signal from the at least one transponder antenna and electrically couples the transponder signal to the reader circuit, the transponder signal storing information to identify data stored on the identification tag.

4. The reader apparatus in accordance with claim 1 wherein the transport device is a conveyor bed and a conveyor belt is extended over at least a portion of the support plate.

5. A reader apparatus for use with a transport device having a support plate with a separation therein, the reader apparatus, when in operation with the transport device, is used for identifying an object having an identification tag secured thereto, the reader apparatus comprising:
    a first reader antenna and a second reader antenna designed to be positioned lower than the support plate and in proximity with the separation located in the support plate;
    a third reader antenna coupled to ground; and
    a reader circuit in electrical communication with the first, second and third reader antennae such that when the object moves across the separation located in the support plate, the first and second reader antennae couple with the identification tag and data is read by the reader circuit.

6. A method for identifying an object having an identification tag attached thereto, comprising:
    providing a first reader antenna and a second reader antenna to be positioned lower than a support plate and in proximity to a separation provided in the support plate;
    providing a reader circuit that outputs an excitation signal which is electrically coupled to the first and second reader antennae;
    coupling the reader circuit to ground;
    when the object moves across the separation located in the support plate, coupling at least one of the first and second reader antennae to at least one transponder antenna located in the identification tag; and
    identifying data stored in the identification tag at the reader circuit.

7. The method in accordance with claim 6 wherein the step of coupling the reader to ground is achieved by providing a third antenna to be electrically coupled to the reader circuit and coupled to ground.

8. The method in accordance with claim 6 wherein the first reader antenna transmits the excitation signal to the transponder antenna, and the second reader antenna receives a transponder signal from the transponder antenna and transmits the transponder signal to the reader circuit, the transponder signal storing information to identify the identification tag.

9. The method in accordance with claim 7 wherein the third reader antenna is coupled to ground via one of the frame and the support plate.

10. The method in accordance with claim 6 wherein the transport device is a conveyor bed, and further comprising the step of extending a conveyor band over at least a portion of the support plate.

11. A method for identifying an object having an identification tag attached thereto, comprising:
    providing a reader antenna to be positioned lower than a support plate and in proximity to a separation provided in the support plate;
    providing a reader circuit to output an excitation signal which is electrically coupled to the reader antenna;
    when the object motes across the separation located in the support plate, coupling the reader antenna to the identification tag;
    electrically coupling the reader antenna to the reader circuit; and
    identifying data stored in the identification tag at the reader circuit.

12. The method in accordance to claim 11 wherein the identification tag comprises a first transponder antenna which is capacitively coupled to the reader antenna and a second transponder antenna which is coupled to ground via the support plate.

13. The method in accordance with claim 11 wherein the separation is an aperture.

14. A reader apparatus for use with a transport device having a support plate with an aperture therein, the reader apparatus, when operating with the transport device, is used for identifying an object having an identification tag attached thereto, the identification tag comprises at least one transponder antenna, the reader apparatus comprising:

a first reader antenna designed to be coupled to ground;

a second reader antenna designed to be positioned lower than the support plate and in proximity with the aperture located in the support plate; and a reader circuit in electrical communication with the first and second reader antennae such that when the object moves across the aperture located in the support plate, the second reader antenna couples with the at least one transponder antenna and data is read from the identification tag by the reader circuit.

15. A reader apparatus for use with a transport device having a support plate with an aperture therein, the reader apparatus, when in operation with the transport device, is used for identifying an object having an identification tag secured thereto, the reader apparatus comprising:

a reader antenna, the reader antenna designed to be positioned lower than the support plate and in proximity with the aperture located in the support plate; and a reader circuit coupled to ground and in electrical communication with the reader antenna such that when the object moves across the aperture located in the support plate, the reader antenna couples with the identification tag and information is read from the identification tag by the reader circuit.

16. A method for identifying an object having an identification tag attached thereto, comprising:

providing a first reader antenna and a second reader antenna;

coupling the first reader antenna to ground;

positioning the second reader antenna lower than a support plate and in proximity to an aperture provided in the support plate;

outputting from a reader circuit a current of alternating polarity which is electrically coupled to the first and second reader antennae;

when the item moves across the aperture located in the support plate, coupling the second reader antenna to a transponder antenna located in the identification tag; and identifying the object to which the identification tag is attached at the reader circuit via the second reader antenna.

17. A method for identifying an object having an identification tag attached thereto, comprising:

providing a reader antenna to be positioned lower than a support plate and in proximity to an aperture provided in the support plate;

providing a reader circuit to output a current of alternating polarity which is electrically coupled to the reader antenna;

when the object moves across the aperture located in the support plate, coupling the reader antenna to the identification tag; and identifying the item to which the identification tag is attached at the reader circuit via the reader antenna.

18. The method in accordance with claim 17 wherein the reader antenna couples to the identification tag via at least one transponder antenna located on the identification tag.

* * * * *